May 16, 1961　　　C. M. JOHNSON　　　2,984,022
EARTH-MOVING MACHINE

Filed Oct. 28, 1957　　　2 Sheets-Sheet 1

INVENTOR:
Charles M. Johnson,
BY Cushman, Darby & Cushman
ATTORNEYS.

May 16, 1961
C. M. JOHNSON
2,984,022
EARTH-MOVING MACHINE
Filed Oct. 28, 1957
2 Sheets-Sheet 2
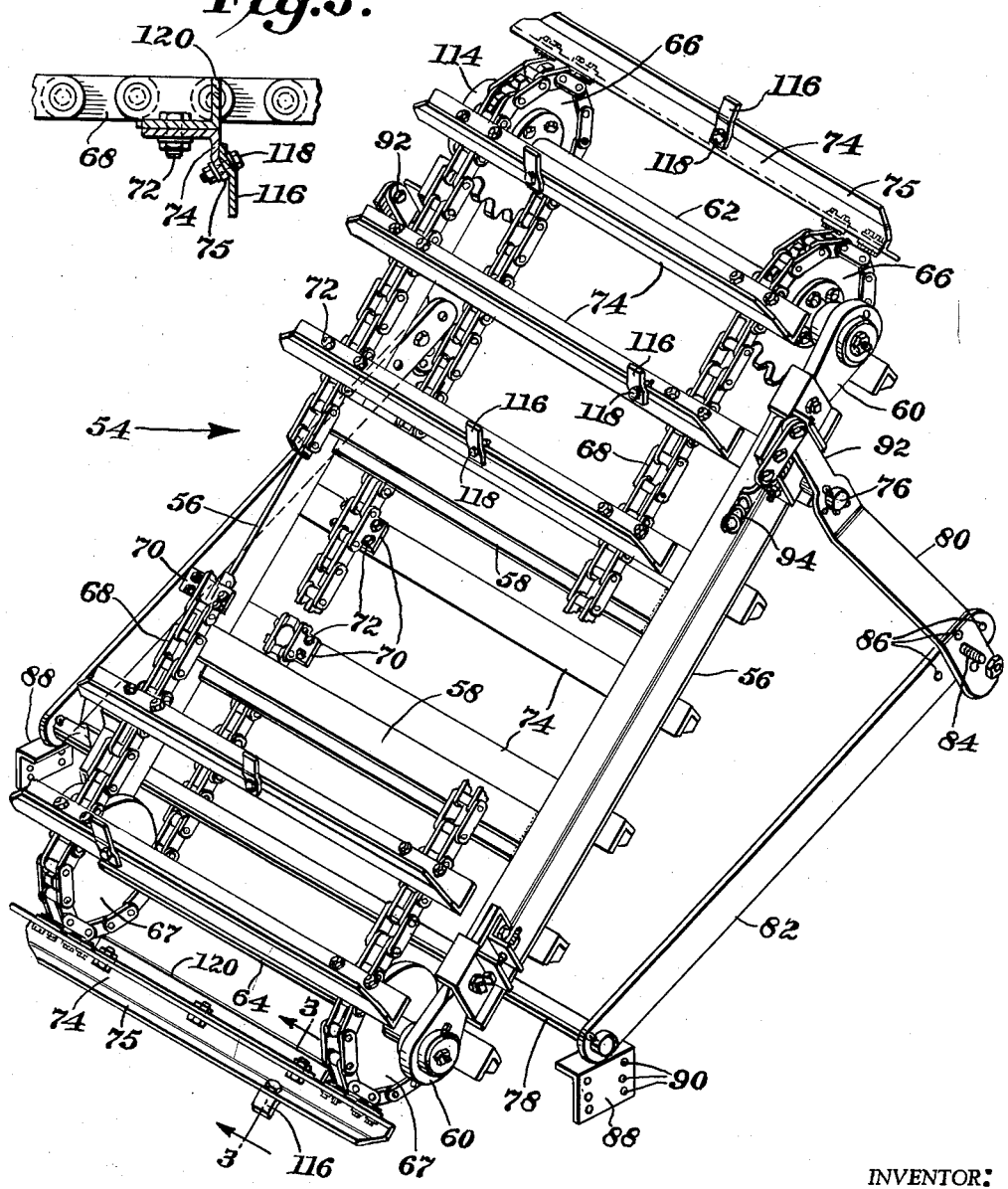
INVENTOR:
Charles M. Johnson,
BY Cushman, Darby & Cushman
ATTORNEYS.

United States Patent Office 2,984,022
Patented May 16, 1961

2,984,022

EARTH-MOVING MACHINE

Charles M. Johnson, Lubbock, Tex., assignor to Johnson Manufacturing Company, Lubbock, Tex., a corporation of Texas Filed Oct. 28, 1957, Ser. No. 692,766

4 Claims. (Cl. 37—8)

This invention relates to improvements in earth-moving apparatus and, more particularly, in machines of that character in the form of a wheeled container having, at its forward end, a scraper blade adapted to be lowered into engagement with the earth to scrape dirt up into the container, on forward movement thereof, for transport to and discharge at another location.

Earth-moving scrapers of the foregoing type usually are drawn by a tractor and, in order to reduce the draft necessary to pull such apparatus, the latter have been equipped with scraper-type conveyors that are driven by the power take-off of the tractor and arranged to move the pile of dirt scraped up by the scraper blade rearwardly into the container. The addition of such a conveyor to scraper-type earth-moving equipment, not only effects the aforementioned draft reduction but also decreases the time necessary to fill or load such equipment with dirt to its full capacity. While conveyor-equipped scrapers are an improvement over prior types, they are susceptible of additional improvements to increase the efficiency of the conveyor with a resulting reduction in both draft requirements and loading time.

It is, therefore, an object of this invention to provide means for increasing the efficiency of load-facilitating conveyors of earth-moving scrapers.

It is another object of this invention to provide an improved mounting for a load-facilitating conveyor of a scraper which not only will permit the lower end of the conveyor to rise freely to clear any rocks or the like which might be scraped up by the scraper blade, but also will enable the conveyor to move a greater quantity of dirt rearwardly to thereby increase the effectiveness of the earth-cutting and scraping-up action of the scraper blade.

It is another object of this invention to provide an improved mounting of the foregoing type which results in a greater dirt-moving capacity for the conveyor for a given power input thereto.

It is still another object of this invention to provide a conveyor of the foregoing type with means for more readily breaking up large clods of earth which might impede the action of both the conveyor and the scraper blade and for more readily moving rearwardly into the container any trash or debris in the nature of rubble, brush, or the like which may be scraped up by the blade.

Other objects and advantages of the invention will become apparent from the following description and accompanying drawings in which:

Fig. 2 is an enlarged perspective view, with parts broken away to illustrate details, of the dirt-moving conveyor shown in Fig. 1.

Fig. 3 is an enlarged fragmentary vertical sectional view taken substantially on line 3—3 of Fig. 2.

Figure 1:
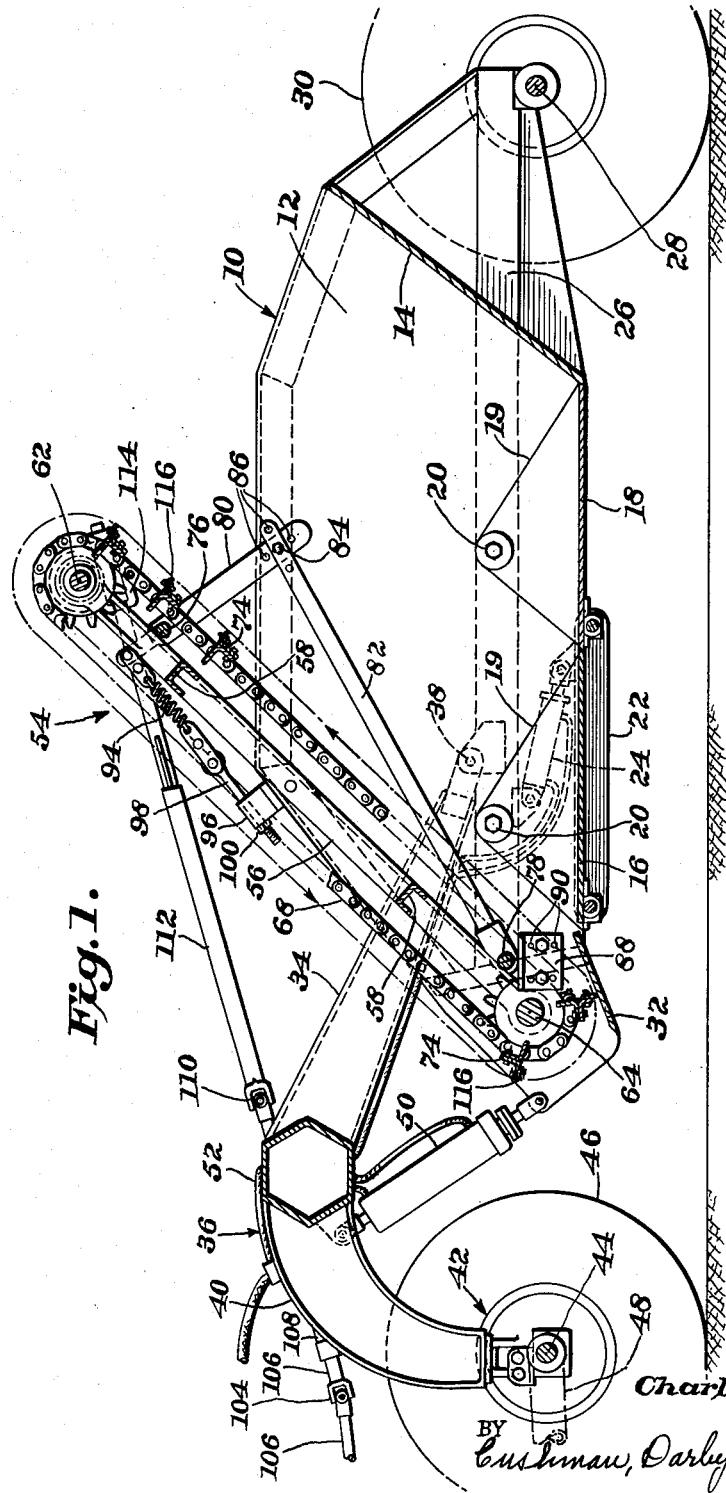
Fig. 1 is a longitudinal vertical sectional view of a scraper-type earth-moving machine embodying this invention.

Referring now to the drawings, there is shown in Fig. 1 an open-top and open-front earth-moving container 10 having side walls 12 and a rear wall 14. The bottom of the container is formed by two dumping doors 16 and 18, each mounted for swinging movement about a horizontal axis by bolts 20 that pivotally connect upstanding ears 19 at the sides of each door with the container side walls 12. Links 22 on opposite sides of the container 10 connect the two doors 16 and 18 together for simultaneous swinging movement. The doors 16 and 18 may be moved between their open and closed positions, and retained in the latter, by double-acting hydraulic cylinders 24, one on each side of the container 10 and each pivotally connected at one end to the corresponding side wall 12 and at the other end to the corresponding link 22. The container 10 preferably is re-enforced by an exterior frame that has side portions 26 which extend rearwardly of the rear wall 14 and are supported on the opposite ends of an axle 28 on which are journalled ground-engaging wheels 30.

At its forward and lower end, immediately in advance of the front dumping door 16, the container 10 is provided with a downwardly and forwardly inclined fixed scraper blade 32 which extends between the side walls 12. Obviously, when the forward end of the container 10 is moved downwardly so that the scraper blade 32 engages the earth, forward movement of the container scrapes up dirt by the blade.

The two arms 34 of a fork-like or wishbone-shaped member 36 straddle the container 10, at its forward end, and have their free ends pivotally secured to the outer sides of the container, as at 38, at positions disposed rearwardly of the blade 32. The stem 40 of the member 36 is in the shape of a gooseneck having a fifth wheel arrangement, generally indicated at 42, mounting a transverse axle 44 which carries a pair of ground-engaging wheels 46. Connected to the axle 44 is a draw bar 48, generally indicated in dotted lines, that may be connected to an appropriate prime mover (not shown), such as a tractor, for towing the earth-moving machine. Two-way hydraulic cylinders 50, one at each side of the container 10, are connected between the transverse arm-connecting portion 52 of the member 36 and the lower forward portions of the outer sides of the container in advance of the pivotal connection of the arms 34 with the container. When the cylinders 50 are retracted, as shown in Fig. 1, the scraper blade 32 is held up out of engagement with the earth so that the apparatus may be towed freely along the ground. Extension of the cylinders 50, however, serves to move the forward end of the container 10 down so that the scraper blade 32 will penetrate into the earth to a predetermined depth. In this position, forward movement of the apparatus causes the scraper blade 32 to dig into and scrape up dirt.

Disposed within the open front of the container 10 is an upwardly and rearwardly inclined scraper-type endless conveyor 54 having its lower forward end disposed immediately above the scraper blade 32. The conveyor 54 has a frame which includes longitudinal side members 56, that may be formed of angle bars, connected together by longitudinally-spaced transverse members 58, that may be in the form of channel elements. Both ends of both side members 56 are provided with longitudinally-adjustable extensions 60 in which are journalled transverse shafts 62 and 64. Secured on the shaft 62 is a pair of transversely-spaced sprockets 66 and secured on the shaft 64 is a pair of laterally-spaced rollers 67. Trained over the corresponding sprockets and rollers is a pair of laterally-spaced endless chains 68. At uniform intervals along the chains 68 the links thereof are provided with laterally extending ears 70 (Fig. 2) to which are secured, as by bolts 72, flights or scraper bars 74, each preferably in the form of an angle bar having one flange thereof secured flatwise by the bolts 72 to the outer peripheries of the chains. Preferably, the lip of the other flange of each bar 74 is bent slightly forwardly, as shown in Fig. 3 at 75, in order to bite into the dirt more effectively.

The conveyor frame, adjacent its opposite ends, has transverse rods 76 and 78 secured, in any suitable manner as by welding, to the underside of the side members 56. These rods 76 and 78, at their opposite ends, are extended outwardly beyond the side frame members 56. Pivotally connected to the ends of the rod 76 at the upper and rearward end of the conveyor are a pair of downwardly and rearwardly extending short lever arms 80. Pivotally connected to the ends of the rod 78 at the lower or forward end of the conveyor are a pair of upwardly and rearwardly extending long lever arms 82. The free ends of each pair of short and long lever arms 80 and 82 on one side of the frame are connected together by a bolt 84, which also passes through the corresponding sidewall 12 of the container 10 at a point substantially directly beneath the upper and rearward end of the conveyor 54, as shown in Fig. 1. Thus, the bolts 84 serve as pivot pins to mount the conveyor 54 on the container 10 for swinging movement in a vertical plane. Preferably, the free ends of the short and long lever arms 80 and 82 are each provided with a longitudinal series of bolt-receiving apertures 86 so that the angle of inclination of the conveyor 54, when at rest as later described, can be adjusted both to accommodate different types of earth being moved by the machine, and to adjust the bite or angle of attack of the scraper bars 74.

From the foregoing, it will be seen that the forward and lower end of the conveyor 54 rests directly upon the dirt being scraped up by the scraper blade 32, when the latter is positioned by the cylinders 50 in scraping position. In order to prevent the scraper bars 74 of the conveyor 54 from contacting and possibly becoming damaged by engagement with the scraper blade 32, stop elements 88, which may be in the form of short sections of angle bar, are bolted to the interior of the side walls 12 of the container 10 in position to be engaged by the ends of the levers 82. Preferably, the stop elements 88 are each provided with several series of bolt-receiving holes 90 so that they can be adjustably positioned on the side walls 12 of the container 10 to vary the distance between the conveyor flights 74 and the scraper blade 32, depending upon the type of ground or earth operated upon by the apparatus.

In order to urge the forward and lower end of the conveyor 54 downwardly upon the pile of dirt being scraped up by the blade 32, with a force greater than that of the weight of the forward portion of the conveyor alone, the short lever arms 80 are provided with extensions 92 which extend upwardly beyond the rod 76. Coil tension springs 94 are interconnected between the ends of these extensions 92 and brackets 96 on the side walls 12 of the container 10. The attachment of the springs 94 preferably includes eye-bolts 98 extending through the brackets 96 and having retaining nuts 100 threaded thereon, or some other equivalent structure for adjusting the tension of the springs to vary the force with which the forward end of the conveyor 54 is constantly urged downwardly upon the pile of dirt being scraped up.

The conveyor 54 normally is driven from a power take-off (not shown) of the towing prime mover, and the drive train may include a shaft 102 connectable directly to the power take-off and, through a universal joint 104, to one end of a shaft 106 journalled on a bracket 108 mounted on the gooseneck 40. The other end of the shaft 106 may be connected, as through another universal joint 110, to one end of an extensible and contractable shaft 112, the other end of which is connected to the upper conveyor shaft 62 through appropriate gears (not shown) in a gear box 114 mounted upon the upper extension 60 of one of the side frame members 56.

By reason of the foregoing construction, it will be seen that the pivotal mounting of the conveyor 54 on the container 10 permits the forward and lower end of the conveyor to move upward on encountering rocks or similar material scraped up by the scraper blade 32, so as to clear such rocks and avoid any possibility of damage to the conveyor. It will be seen, however, that because the forward end of the conveyor 54 is constantly urged downwardly with the increased force created by the springs 94, in addition to the weight of the lower portion of the conveyor, the flights 74 dig deeper into the scraped up dirt pile and take larger bites from such pile to move dirt rearwardly into the container 10. Since these larger bites enable the dirt to be moved rearwardly faster and more effectively, the dirt pile is kept to a minimum size so that the blade 32 is kept relatively clear of any large quantity of dirt to thereby render the cutting and scraping action of the blade more efficient. Additionally, because of the aforementioned greater bites, the dirt is moved back into the container 10 faster and more effectively so that the conveyor flights 74, as they move upwardly and rearwardly, become disengaged from the dirt pile after they have travelled upwardly and rearwardly only a relatively short distance. Consequently, because the flights 74 are not in engagement with the dirt pile from the lower end of the conveyor 54 all the way up to the upper edges of the container side walls 12, the power required to drive the conveyor is somewhat reduced.

Actual tests have proved that the aforedescribed improved mounting of the conveyor 54 results in a reduction of about 25% in the power required to operate the apparatus and about 25% in the time required for loading, as compared with prior machines of this type. For example, a machine embodying this invention, and having a capacity of 11 cubic yards, can be loaded with the same prime mover in approximately the same time that was formerly required to load a prior machine having only an 8 cubic yard capacity.

Preferably, each of the flights or scraper bars 74 of the conveyor 54 has a projecting tooth 116, that may be secured, as by a bolt 118, to the scraping edge of the flight. This tooth 116 is adapted to dig into the dirt pile scraped up by the blade 32 to break up any clods of earth in such pile so that the latter may be conveyed rearwardly into the container by the conveyor flights 74. Preferably, the teeth 116 are staggered from flight-to-flight. It has been found in actual practice that these teeth 116 not only break up large clods of earth, but also tend to move trash and other debris, such as rubble and brush, rearwardly into the container 10. In the absence of such teeth 116, it has been found that when the apparatus is operated in hard packed or clod-forming earth, or in ground that is covered with debris of the aforementioned type, such material tends to pile up on top of the scraper blade 32 without effective rearward movement by the conveyor 54. Such pile-up impedes both the scraping action of the blade and the rearward moving action of the conveyor. Furthermore, it will be seen that such a pile-up increases the draft necessary to tow the apparatus.

Because of the fact, as stated above, that less power is required to drive the conveyor 54 than in prior machines, it has been found that the effective dirt-moving area of the conveyor flights 74 can be increased. This can be done, for example, and as shown in Fig. 2 on the flight at the extreme forward end of the conveyor, by bolting additional sections of angle iron to each conveyor flight 74. Preferably, these sections of angle iron have a flange 120 which extends inwardly from the outer peripheries of the chains 68 and between the latter.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modi-

I claim:

1. Earth moving apparatus comprising: a mobile open-front dirt-carrying container of greater length than depth having bottom, side and rear walls; a pair of laterally-spaced ground-engaging supporting wheels mounted to said container rearwardly of and adjacent the rear end of said container; a frame member secured to and extending forwardly of the front end of said container, the forward end of said frame member being adapted to be supported on another pair of laterally-spaced ground-engaging supporting wheels; a dirt-digging scraper carried by said container at the front of said bottom wall for scraping up dirt for discharge into said container; an endless scraper-type conveyor extending upwardly and rearwardly from said scraper for moving dirt dug and scraped up thereby rearwardly into said container, said conveyor being located substantially within the forward half of said container in substantial spaced relation to said rear wall; means connectible to a motor for driving said conveyor; and means pivotally mounting said conveyor on said container side walls on a fixed axis for swinging movement in a vertical plane, the forward end of said conveyor being free to swing upwardly relative to said scraper, said axis being located substantially midway between the ends of said side walls substantially directly below and spaced from the upper end of said conveyor.

2. The structure defined in claim 1 including adjustable force-producing means connected to said container, adjacent an upper front portion thereof, and to said conveyor, adjacent its rearward end, for yieldably urging said conveyor to pivot in a direction to move the forward end thereof down onto the dirt being scraped up by the scraper.

3. The structure defined in claim 2 including stop means adjustably mounted on the container engageable by a forward portion of the conveyor frame to adjustably limit downward movement of the forward end thereof relative to the scraper.

4. The structure defined in claim 1 in which the means pivotally mounting the conveyor is adjustable to vary the location of the said pivotal axis, and thereby the inclination of the conveyor.

References Cited in the file of this patent

UNITED STATES PATENTS

| | | |
|---|---|---|
| 7,723 | Sprague | Oct. 15, 1850 |
| 77,833 | Palmer | May 12, 1868 |
| 645,443 | Weaver | Mar. 13, 1900 |
| 712,086 | Oeder | Oct. 28, 1902 |
| 878,890 | Pearson | Feb. 11, 1908 |
| 1,537,558 | Schultz | May 12, 1925 |
| 1,771,025 | Barry | July 22, 1930 |
| 2,042,193 | Schema | May 26, 1936 |
| 2,153,037 | Chaffins | Apr. 4, 1939 |
| 2,172,672 | Daniels | Sept. 12, 1939 |
| 2,243,831 | Berner | June 3, 1941 |
| 2,368,422 | Oberkamper | Jan. 30, 1945 |
| 2,464,098 | Pittlick | Mar. 8, 1949 |
| 2,587,092 | Bartsch | Feb. 26, 1952 |
| 2,603,345 | Hyman | July 15, 1952 |
| 2,606,376 | Mork | Aug. 12, 1952 |
| 2,637,917 | Klaucke | May 12, 1953 |
| 2,791,041 | Hancock | May 7, 1957 |
| 2,844,892 | Carston | July 29, 1958 |

FOREIGN PATENTS

| | | |
|---|---|---|
| 114,387 | Sweden | June 26, 1945 |